April 2, 1935.　　　　　J. HAHN　　　　　1,996,617

FLYING SHEAR

Filed Aug. 14, 1931　　　6 Sheets-Sheet 1

Fig. 1.

WITNESS

INVENTOR
Johann Hahn

April 2, 1935.　　　　J. HAHN　　　　1,996,617
FLYING SHEAR
Filed Aug. 14, 1931　　6 Sheets-Sheet 6

Patented Apr. 2, 1935

1,996,617

UNITED STATES PATENT OFFICE 1,996,617

FLYING SHEAR

Johann Hahn, Pittsburgh, Pa., assignor to United Engineering & Foundry Company, Pittsburgh, Pa., a corporation of Pennsylvania Application August 14, 1931, Serial No. 556,962

23 Claims. (Cl. 164—49)

This invention pertains to metal shearing apparatus, and more particularly to a reciprocatory type, commonly referred to in the art as a flying shear, for cutting metal sheets, strips, bars and the like into sections of predetermined length while the stock is in motion.

The object of the invention, generally stated, is to provide a shear of this nature which is of simple and sturdy construction, dependable in operation and susceptible of being adjusted with ease to vary the lengths of the cuts and speed of operation while it is in motion.

Another object is to provide a flying shear of the above-noted character in which the cutting blades, in addition to being reciprocated transversely of the stock for effecting the cuts, are also positively oscillated in the direction of the line of travel of the stock to cause the blades to move with the stock when the cut is made, and in which the mechanism employed for producing such oscillations is designed to be adjusted in such a way that the linear speed of the blades may be synchronized with that of the stock at the instant of cutting.

A still further object is to provide such a shear in which one or both of the cutting blades are moved out of the path of travel of the stock during the entirety of its or their movement with the exception of the instant of cutting to avoid fouling or marking of the stock between cuts.

Another object is to provide, in a shear embodying the foregoing novel features, for varying the speed of the shears with respect to the speed of the stock, or vice versa, so that variations may be made in both the lengths of the cuts and the speed of operation of the machine.

It is also an object to provide a shear of the above-noted character in which manually as well as automatically controlled means are provided for preventing or causing the shear blades making cutting engagement with each other or with the stock when they are reciprocated, and for doing so without otherwise interfering with the normal movement of the apparatus, whereby to increase the variations in lengths of cuts permissible in the machine as well as increase the variations in the limits of its operation.

These and various other objects, as well as the various other novel features and advantages of the invention, will be apparent when the following detailed description is read in conjunction with the accompanying drawings, wherein Fig. 6 a vertical section taken on the line VI—VI of Fig. 3, while Fig. 7 is a vertical section taken on the line VII—VII of Fig. 2, the cutter frames in such view being tilted forward out of the plane of the section.

Figure 1:
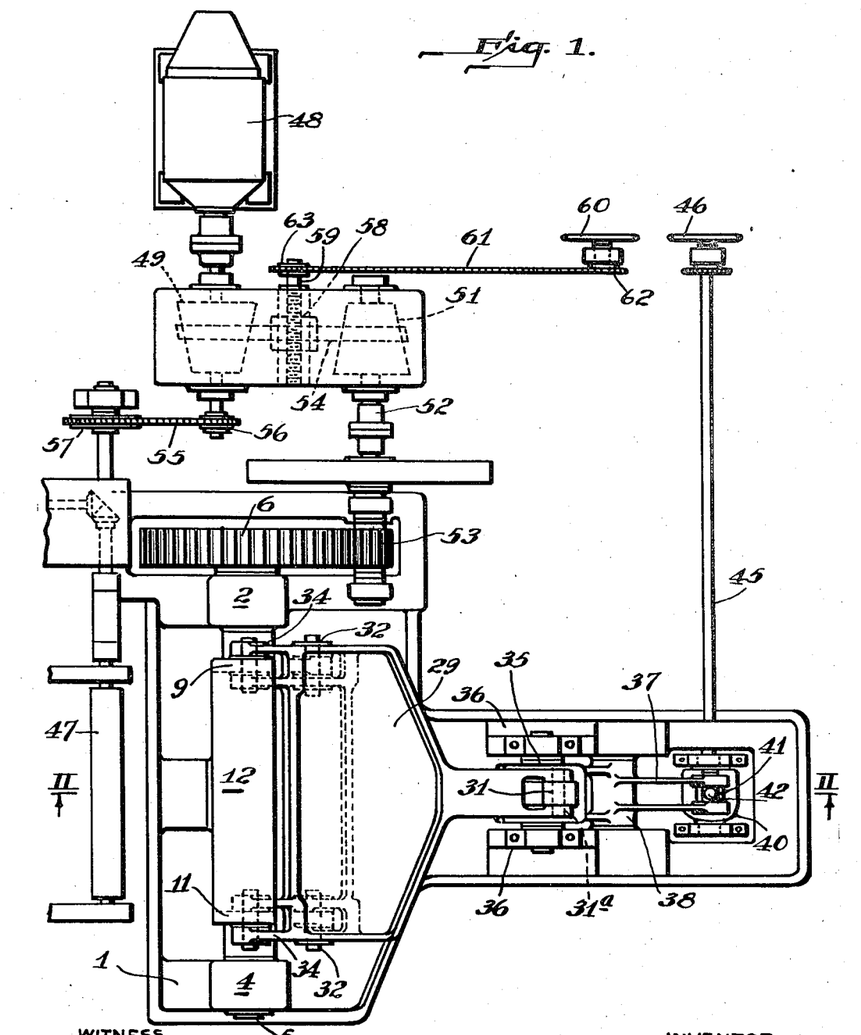
Fig. 1 is a plan view of one form of a flying shear constructed in accordance with the invention, and Fig. 2 a sectional view of the same taken on the line II—II of Fig. 1.
Figure 2:
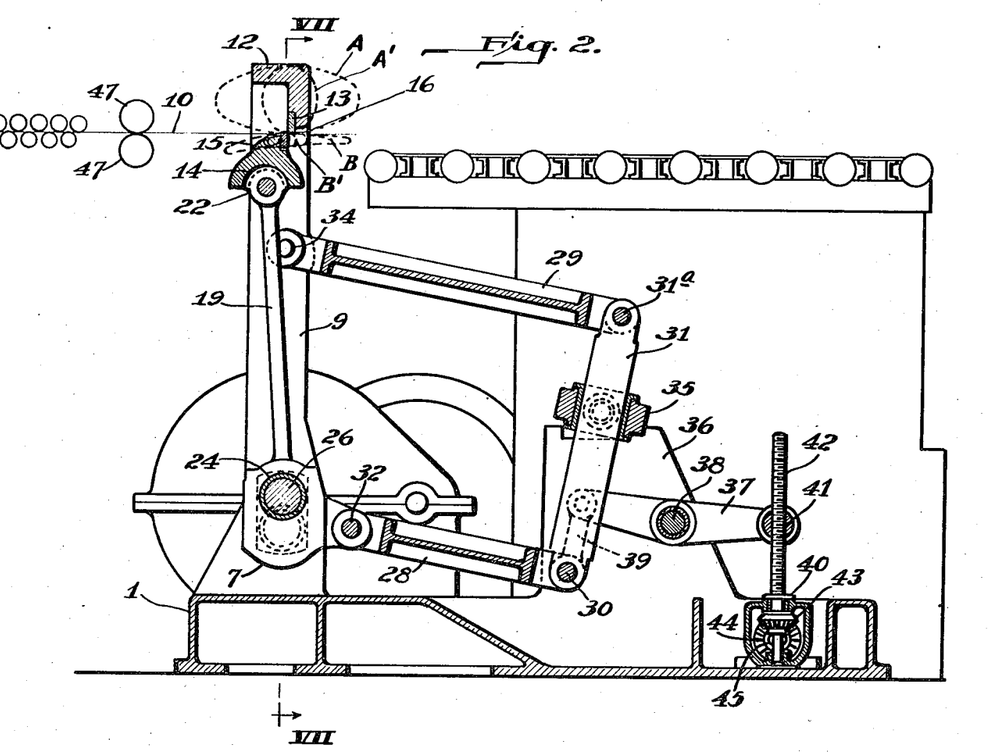
Figures 6, 7:
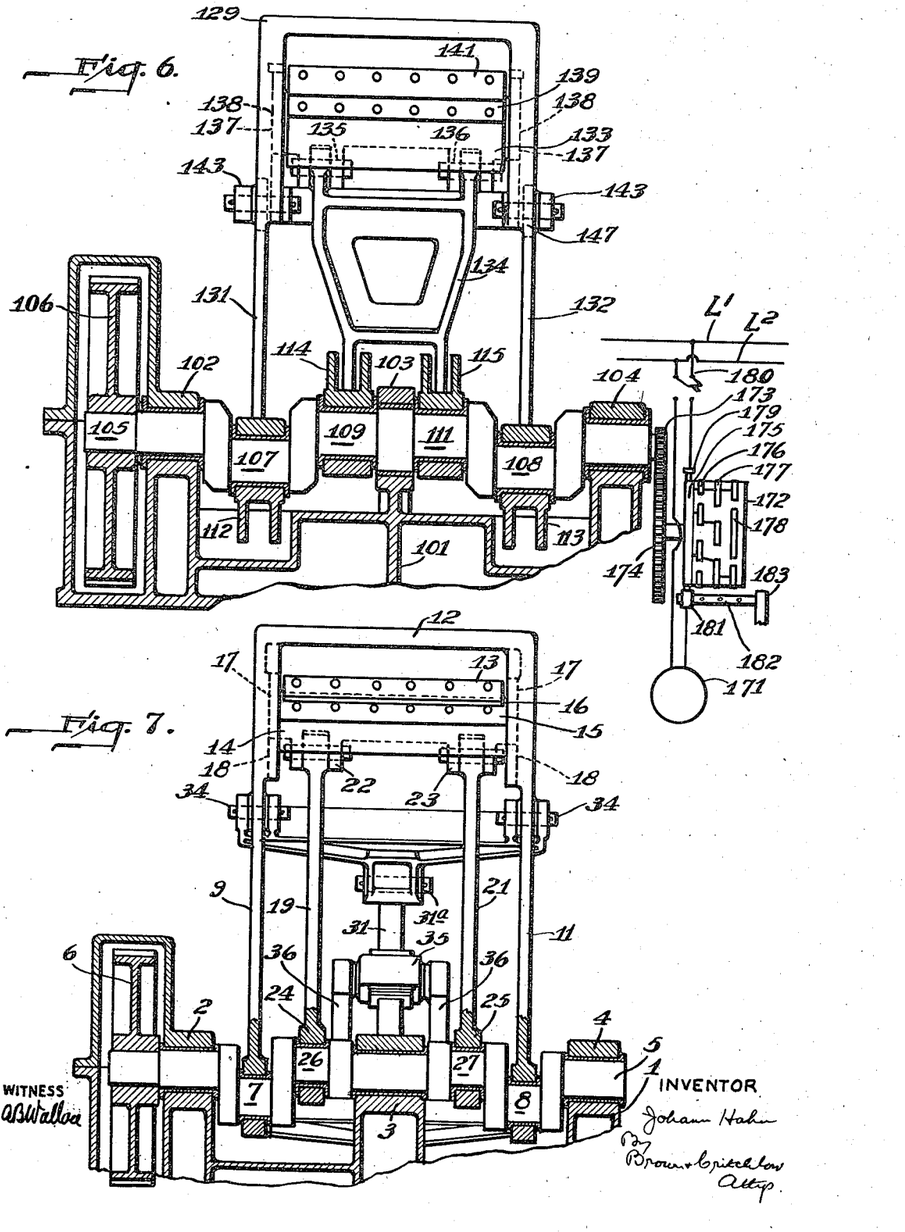

Referring to the drawings the embodiment of the invention illustrated in Figs. 1, 2 and 7 comprises a frame or base 1, which is provided at its forward end with three main bearing supports 2, 3, and 4 (see Fig. 7). In these there is mounted a shaft 5 which is equipped at one end with a keyed gear 6 for connecting it to a drive for operating the apparatus, as will presently appear.

Adjacent the inner faces of bearings 2 and 4, respectively, there are provided a pair of cranks 7 and 8 which are connected to the lower ends of a pair of side arms 9 and 11 forming the lower portion of an outer cutter frame 12 which is employed to carry an upper shear blade 13. Within this outer cutter frame there is arranged an inner cutter frame or cross head 14 which has mounted on it a lower shear blade 15 that is adapted to form a cutting pass 16 with blade 13. The ends of this latter frame are provided with lugs 17 which are mounted for movement in guideways or slots 18 formed in the inner sides of arms 9 and 11 to insure blade 15 registering with blade 13 when frames 12 and 14 are reciprocated and oscillated, as will presently appear.

To allow crosshead 14 to oscillate with frame 12 and at the same time support it and blade 15 in such a way as to cause the latter to cooperate with blade 13 in shearing a piece of stock 10 fed between the two, the crosshead is mounted on a pair of pivotally supported pitman rods 19 and 21 which are connected to it at their upper ends by hinge joints 22 and 23. The lower ends 24 and 25 of these rods may be pivotally mounted on any suitable support, but, as shown here, are conveniently connected to shaft 5 on opposite sides of main bearing 3. To insure the lower blade 15, like blade 13, being carried out of the path of travel of the stock so that it will not contact or mar the stock between cuts, shaft 5 is provided with two cranks 26 and 27, respectively, to which rods 19 and 21 are attached. These cranks are opposed to cranks 7 and 8 so that blade 13 moves simultaneously with, but in an opposite direction to, blade 15 when shaft 5 is rotated, and the eccentricity thereof, which is preferably less than that of the first-mentioned cranks, may vary from zero up to any amount desired.

In order to prevent the blades of the shear from interfering with the continuous movement of the stock when the cut is made, a plurality of connecting and slide links 28, 29 and 31 are employed to oscillate cutter frame 12 as well as both blades 13 and 15 in the direction of travel of the stock. The lower of these, links 28, are pivotally connected at 32 to the lower ends of side arms 9 and 11 of frame 12 and to the lower end of slide link 31 by a pin 30. In a like fashion the upper links 29 are pivotally connected at one end to arms 9 and 11 at 34 near the upper end of frame 12 and to the upper end of link 31 by a pin 31a. To produce horizontal oscillations in frame 12 through the use of these links as a result of the movement imparted to link 28 by its connection to the lower end of frame 12, link 31 is slidably engaged in a fulcrum element 35 pivotally anchored in brackets 36 provided on base 1 forward of the main bearings 2, 3 and 4. With such an arrangement, each time link 28 is reciprocated with the rotation of shaft 5, frame 12 is oscillated in a direction transverse to the reciprocatory movement imparted to it by cranks 7 and 8, hence in the direction of the line of travel of the stock. In order to insure most perfect horizontal movement of the blades at the instant of cutting, the links 28, 29 and 31 are so connected as to cause the blades to be moving at a uniform speed when the cut is made. The travel of the blades during each cycle of operation is illustrated by the dotted lines A and B shown at the top of Fig. 2, and, as will be noted, at all times except at the instant of cutting the blades are out of the path of travel of the stock.

The period of the oscillations is determined by the speed of rotation of shaft 5. Consequently the horizontal speeds of the blades produced by such oscillations are determined by the amplitude of the oscillations. This amplitude is in turn determined by the relative distances between the two ends of link 31 and the fulcrum 35. Accordingly, by providing for adjusting the relation of these distances the horizontal speed of the blades at the instant of cutting may be varied to accord with different speeds of the stock. Toward such end a lever 37 is pivotally mounted at 38 in brackets 36 and connected at its one end by links 39 with the lower end of link 31. The opposite end is designed to pivotally support a traveling nut 41 which is mounted on a threaded shaft 42. This latter shaft is in turn rotatably secured against endwise movement at its lower end in a suitable bearing 40 located in base 1, and is provided with a miter gear 43 for rotating it. Cooperating with gear 43 is another miter gear 44 which is keyed to a shaft 45 that is extended to one side of the shear frame and provided with a handwheel 46 which is employed for adjusting the position of link 31 in fulcrum 35. Hence, all that is necessary to do to change the horizontal cutting speed of the shear blades without altering the speed of shaft 5, is to turn wheel 46. In accordance with this arrangement, as will be readily appreciated, such changes may be made without in any way interfering with the other normal operations of the machine, and while the machine is in motion.

For feeding the stock to the shear a pair of pinch rolls 47 are located just forward of the cutting blades, and for driving both these and drive shaft 5 a variable speed motor 48 is provided. While any suitable speed-varying driving connection may be employed to connect motor 48 to the pinch rolls and shaft 5, such is shown here as comprising a cone 49 which is coupled directly to the motor and a cone 51 which is connected by a shaft 52 with a pinion gear 53 that is arranged to engage gear 6, the connection between the two cones being made by a belt 54. The pinch rolls are connected to be driven from cone 49 by a chain 55 which is extended over a sprocket 56 mounted on the shaft of that cone and a sprocket 57 mounted on a shaft carrying one of the pinch rolls. With this arrangement the speed of the pinch rolls and so the cutters is varied by varying the speed of motor 48 and that of the shear with respect to the pinch rolls by moving belt 54 axially on cones 49 and 51. To shift belt 54 a shifting element 58 is mounted for movement on a threaded shaft 59 which is connected to be operated through the agency of a chain 61 and sprocket wheels 62 and 63 by a wheel 60 located near wheel 46 for convenience.

To adjust the shear for operation, motor 48 is adjusted to actuate the pinch rolls 47 at such a speed as will feed the stock through the shears at the speed desired. Belt 54 is then so adjusted by turning wheel 60 as to cause shaft 5 to rotate at such a speed as to cause blades 13 and 15 to cut the stock into the lengths desired, such lengths being definitely determined by the number of reciprocations per minute which the blades make when the stock is fed therethrough at a given speed. After the rate of cutting of the blades is determined, slide link 31 is adjusted by turning the wheel 46 so that the amplitude of the oscillations of the cutting frame 12 and blades 13 and 15 is such that the horizontal speed of the blades at the instant of cutting is in synchronism with that of the stock. The speeds obtainable in this fashion are determined by limits of the amplitude variations possible as indicated by the dotted curves A and B and A' and B' shown in Fig. 2, curves A and B indicating the travel of the blade when adjusted for the highest speed attainable at a given speed of shaft 5, and curves A' and B' the lowest. These speeds of course can be altered further by variation of the speed of shaft 5 which may be changed in the manner described above.

A further feature of the invention is the provision in a shear of this character of means for causing the blades to miss cuts, so that greater lengths of cuts and greater variation in operation may be obtained. Such a feature is clearly illustrated in the embodiment of the invention shown in Figs. 3, 4, 5 and 6. Like the former shear, this comprises a base 101 which is provided near its forward end with a plurality of main bearing supports 102, 103 and 104 in which there is mounted a drive shaft 105 provided at one end with a driving gear 106. On shaft 105 there are provided a pair of outer main cranks 107 and 108 and intermediate cranks 109 and 111. Upon main cranks 107 and 108 a pair of downwardly bowed levers 112 and 113 are loosely mounted, while on cranks 109 and 111 a pair of similar, but oppositely bowed, levers 114 and 115 are likewise mounted.

Figure 3:
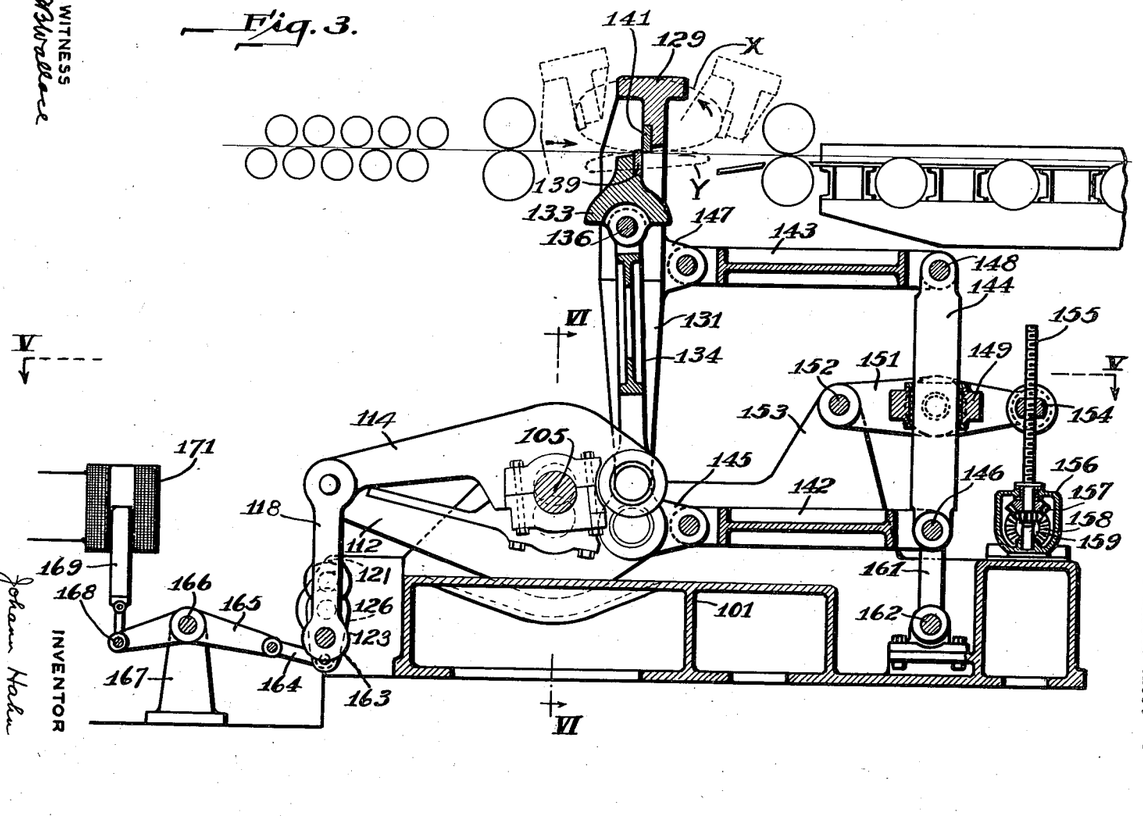
Fig. 3 is a view showing a vertical section taken on the line III—III of Fig. 5 of another embodiment of the invention, in which means are provided for causing the shears to miss cuts, being shown in such figure with the blade actuating mechanism adjusted to effect cutting.
Figure 5:
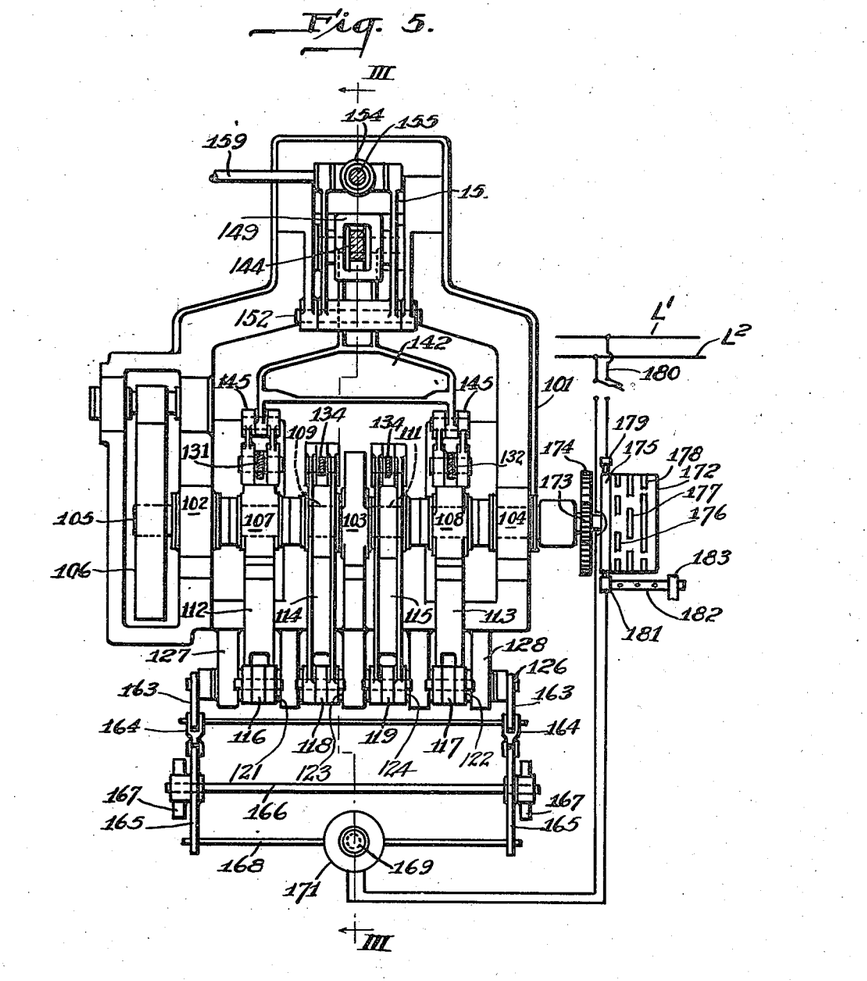
Fig. 5 a horizontal section taken on the line V—V of Fig. 3.

The forward ends of all of these levers are connected respectively by connecting links 116, 117, 118 and 119 with cranks 121, 122, 123 and 124 provided on a shaft 126 which constitutes an adjustable fulcrum support for the levers and is mounted in bearing supports 127 and 128 located on base 101 forward of the bearings 102, 103 and 104. To the rear end of levers 112 and 113 the lower ends of the side arms 131 and 132 of a main cutter frame 129 are pivotally connected. In a like manner the lower end of a bifurcated web 134 is connected to the ends of levers 114 and 115 and to a crosshead 133, the latter connection being made by hinged joints 135 and 136.

This crosshead, as in the former machine, is guided in its movement in frame 129 by lugs 137 which are engaged in grooves 138, and on it a blade 139 is mounted which forms a cutting pass with a blade 141 mounted on the upper end of frame 129. With such an arrangement, when shaft 126 is held against rotation, due to cranks 107, 108, 109 and 111 being diametrically disposed on shaft 105 the cutter frames 129 and 133 are reciprocated simultaneously and in opposite directions whenever shaft 105 is rotated.

In this machine, as in the former, a plurality of connecting links 142 and 143 and a slide link 144 are employed to give horizontal movement to the blades when a cut is made. The lower of these links, 142, is pivotally connected at one end to extensions 145 on levers 112 and 113 and at the other end to a shaft 146 extended through an eye in the lower end of slide link 144. The upper connecting links 143 are pivotally connected at one end to brackets 147 provided on side arms 131 and 132, adjacent the upper end of frame 129, and at their other end to a shaft 148 extended through an eye in the upper end of slide link 144. For effecting oscillations in frame 129 when shaft 105 is rotated link 144 is slidably extended through a fulcrum element 149 which is pivotally supported in a bifurcated rocker 151 which is in turn pivotally supported at one end on a shaft 152 that is supported in a pair of brackets 153 provided on base 101 at the rear of the cutter frame. The other ends of rocker 151 pivotally carry a traveling nut 154 which is arranged to engage a threaded shaft 155 pivotally mounted and held against endwise movement in a bearing 156 provided on base 101. A miter gear 157 is keyed to the lower end of shaft 155 and engaged with a second miter gear 158 which is mounted on a shaft 159 that extends to the side of the frame and provided with an adjustment wheel (not shown) to facilitate adjustment of the horizontal speed of the blades. To insure such adjustment and also permit the necessary movement of link 144, the latter is pivotally held in place by a pair of links 161 which are attached to bearing 162 mounted on base 101. The drive for shaft 105 and the feeding mechanism for this shear have been omitted as they do not differ from that described above.

The normal operation of this embodiment of the invention is the same as that of the one previously described. Consequently such operation need not be repeated. The control of the stroke of the levers 112, 113, 114 and 115 which determines whether the shear blades cut or miss the stock when they are reciprocated is determined by the position of shaft 126. With the arrangement illustrated, which, as will be readily appreciated, may be altered, when the cranks 121, 122, 123 and 124 are disposed in a vertical plane, as shown in Figs. 3 and 5, the limits of the reciprocating movement of the frames 129 and 133 are such that the blades 139 and 141 are moved into cutting engagement with each other with each reciprocation, following in such movement the paths $x$ and $y$. By moving shaft 126 so as to carry cranks 121, 122, 123 and 124 out of the vertical plane such as to the position shown in Fig. 4, the limits of the vertical reciprocation of frame 129 and head 133 are displaced due to the angular adjustment given the levers 112, 113, 114 and 115 so that the blades do not intersect the path of travel of the stock, following with such adjustment the paths $x'$ and $y'$. These paths, of course, as in the former machine are, as described in connection with the former shear, changed by changing the position of fulcrum 149. The extent to which shaft 126 is rotated, up to a half of a revolution, of course, determines the distance at which the paths of travel of the blades are displaced from the stock. In this embodiment of the invention, as in the former, as is obvious it is only essential that one of the blades be reciprocated or displaced to make or miss cuts. Hence as stated above, the eccentricity of the cranks on shafts 105 and 126 which operate one of the cutter frames may be reduced to zero.

For rotating shaft 126 a pair of arms 163 are keyed to its ends and these connected by a pair of links 164 with a pair of rockers 165. These in turn are pivotally supported on a shaft 166 mounted in brackets 167 provided on base 101 in front of the brackets 127 and 128. The forward end of rockers 165 carries a shaft 168 which is pivotally connected to the core 169 of a solenoid 171. When the solenoid is deenergized the core 169 falls, due to gravity, and maintains the lever 165 in the position shown in Fig. 3. In such position the ends of the links 164 lie in a plane passing through them and the center of the shaft 166, whereby a rigid brace is provided for arms 163 for withstanding any shocks which may be imparted to the rockers and links when a cut is being made.

Figure 4:
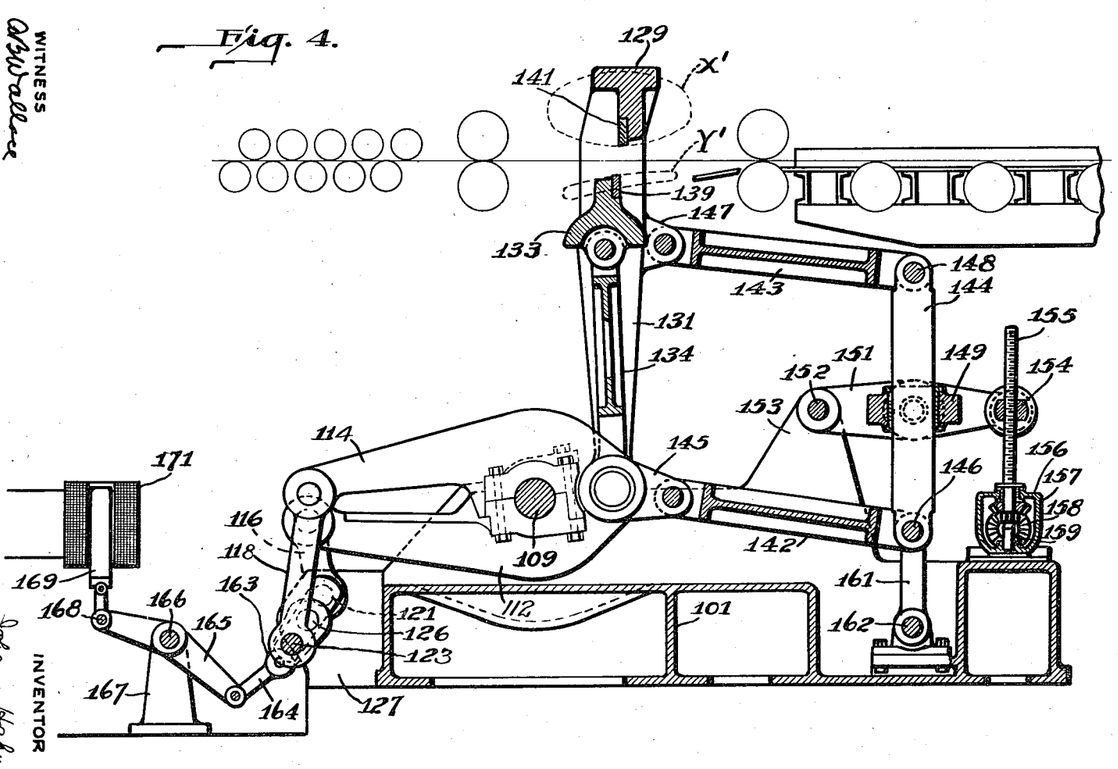
Fig. 4 a view similar to Fig. 3 of the latter embodiment, showing the blade actuating mechanism adjusted to prevent or miss cutting.

When the solenoid 171 is energized the core 169 is actuated to the position shown in Fig. 4, carrying with it the other lever-actuating parts connected to it and adjusting the shear to miss cuts as shown in this figure. To provide for automatically controlling the operation of solenoid 171, a drum switch 172 is provided. This is connected by a pinion gear 173 and a main gear 174 with shaft 105 and consequently is driven in synchronism therewith. Upon the drum there is provided one continuous conductor band 175 and three sets of segmental bands 176, 177 and 178. For cooperation with these bands there are provided a pair of brushes 179 and 181. The former, which is a fixed brush, is arranged to ride continually on band 175, and is connected through one side of a manual switch 180 with line conductor L₁, and the other, which is a movable brush, is arranged for movement on a shaft 182 suitably anchored in support 183 to adapt it to be adjusted to any one of the bands, and is connected to line conductor L₂ through the solenoid and the other side of switch 180. When both brushes 179 and 181 are in contact with band 175 and hand switch 180 is closed, the solenoid is continuously energized. With the brushes in these positions, solenoid 171 may be controlled at the will of the operator by merely opening and closing switch 180. When brush 181 is adjusted, however, to engage any one of the segmental bands 176, 177 and 178, the solenoid is automatically energized and deenergized by the engagement and disengagement of brush 181 with the conductor portions of these bands as the drum is rotated and the arrangement of these conductor and nonconductor portions of each band are made such as to cause the blades to miss or make cuts with each rotation of shaft 105. For determining the operation of the drum switch 172, the ratio of the gears 173 and 174 and the spacings between the sections of the bands 176, 177 and 178 are made such as to give a desired operation to the solenoid. For example, the gear ratio of the gears driving the drum as shown are made 12 to 1, and bands 176, 177 and 178 are divided in 6, 4 and 3 segments, respectively, which are in turn so proportioned that when brush 181 is adjusted to engage band 176 shaft 126 is actuated to cause the blades to miss cutting on every other reciprocation, and when it is adjusted to engage band 177 shaft 126 is so activated as to cause a cut being made only on every third reciprocation, and when it is adjusted to engage band 178, shaft 126 is so activated as to permit a cut only every fourth reciprocation of the blades. This control of the cut missing mechanism, as will be readily appreciated, may be readily altered to give various other cutting combinations.

It will be obvious to those skilled in the art that the invention may be practiced in other than the specific forms disclosed, and accordingly such are not intended as a limitation of the invention as defined in the appended claims.

According to the provisions of the patent statutes, I have explained the principle and mode of operation of my invention, and have illustrated and described what I now consider to represent its best embodiment. However, I desire to have it understood that, within the scope of the appended claims, the invention may be practiced otherwise than as specifically illustrated and described.

I claim:

1. A flying shear comprising a drive shaft having a plurality of eccentrics provided thereon, a blade mounted upon a support carried by said eccentrics, a second blade mounted upon a second support pivotally mounted on said shaft, means for guiding one of said supports in the other, means for driving said shaft to actuate said eccentrics and reciprocate one of said blades with respect to the other transversely of a cutting passage therebetween, and link means including a fulcrum connected to one of said blade supports and arranged to be actuated by said eccentrics for oscillating both of said blade supports in a direction transverse to the reciprocatory movement imparted to the one frame by said eccentrics.

2. A flying shear comprising a drive shaft having an eccentric provided thereon, a cutter frame mounted on said eccentric, a blade carried by said frame, a second cutter frame pivotally mounted adjacent the first mentioned frame for lateral oscillation therewith and arranged to be guided in its movement relative thereto, a blade carried by said last-mentioned frame forming a cutting pass with the first-mentioned blade, means for driving said shaft to reciprocate said first-mentioned blade into and out of cutting relation with the second-mentioned blade, and link means including a link mounted in a fulcrum with one end connected to one of said cutter frames and the other for actuation by said eccentrics for oscillating both of said frames and blades in a direction transverse to that which the first-mentioned frame is reciprocated by said eccentric.

3. A flying shear comprising a drive shaft having an eccentric thereon, a cutter frame mounted on and reciprocated by said eccentric, a blade carried by said frame, a crosshead arranged to move in said frame and adapted to oscillate about a fixed pivot, a blade carried by said crosshead forming a cutting pass with the blade carried by said frame, means for rotating said drive shaft, link means connected to the upper portion of said cutter frames and to said eccentric, a fulcrum member disposed to engage said link means for oscillating said cutter frame and blade in a transverse direction to that imparted to the frame by the eccentric, and means for varying the amplitude of said transverse oscillations to vary the linear cutting speed of the blades.

4. A flying shear comprising a drive shaft having a crank thereon, a cutter frame carried on and reciprocated by said crank, a blade mounted on said frame, a second cutter frame pivotally mounted for cooperative movement with said first-mentioned frame, a blade mounted on said second frame in a manner to form a cutting pass with said first-mentioned blade, means for actuating said shaft to reciprocate said first-mentioned blade into and out of cutting engagement with said second blade, and pivoted means spaced from said crank having one of its ends connected to the upper portion of said cutter frame and the other to be actuated by said crank so as to oscillate both of said cutter frames in a transverse direction to the movement imparted to the first-mentioned cutter frame by the crank, said latter means being timed with respect to the crank so that the blade carried by the crank will engage the other blade only once during each cycle of operation.

5. A flying shear comprising a drive shaft, a pair of cutter frames equipped with cooperating blades pivotally mounted upon said shaft, eccentric means on said shaft for reciprocating one of said frames and its blade in a direction transverse to that of the cutting pass formed by the two blades, link means actuated by said means connected to the upper portion of one of said cutter frames, a fulcrum member disposed to engage said link means in a manner to oscillate both of said frames in the direction of the said cutting pass, means for feeding stock to be cut through said cutting passage, unitary means for driving both said feeding means, and said shear, means for varying the speed of operation of said blades with respect to the speed of the feeding means, and means for varying the amplitude of the oscillations of said blades as produced by said oscillating means whereby to vary the linear cutting speed of said blades at the instant of cutting.

6. A flying shear comprising a cutter frame having a blade mounted thereon, a second blade mounted on a blade carrier arranged to slide in said frame and cooperate with the first mentioned blade to form a cutting pass, means for reciprocating one of said blades into and out of cutting relation with the other, and means for displacing the limits of said reciprocating movement of the one blade to control the cutting engagement of the two blades.

7. A flying shear comprising a driven shaft equipped with an eccentric, a cutter frame having a blade mounted thereon, a second cutter frame equipped with a cutting blade arranged to slide in and cooperate with said first mentioned frame and form a cutting pass therewith, means connecting one of said frames to said eccentric for reciprocating it into and out of cutting relation with the other, means for adjusting the limits of such reciprocable movement of the one blade to cause or prevent the blade being reciprocated thereby from being moved into cutting engagement with the other blade, and means for controlling the operation of said adjusting means.

8. A flying shear comprising a cutter frame having a blade mounted thereon, a second cutter frame equipped with a blade arranged to slide in and cooperate with said first mentioned frame to form a cutting pass, means for reciprocating one of said frames to move the blade attached thereto into and out of cutting relation with the other, means for adjusting the limits of such reciprocable movement to cause or prevent the blades moving into cutting engagement, and means actuated in synchronism with said reciprocating means for swinging said frame and blades in the direction of the cutting pass.

9. A flying shear comprising a cutter frame having a blade mounted thereon, a second blade arranged to cooperate with said first blade and form a cutting pass therewith, means for reciprocating one of said blades into and out of cutting relation with the other, means for adjusting the limits of said reciprocating movement of the one blade to cause or prevent its moving into cutting engagement with the other, means actuated in synchronism with said reciprocating means for swinging said frame and blades transversely to said reciprocating movement, and means for varying the amplitude of said swinging movement.

10. In a flying shear a rotatable shaft, cranks provided on said shaft, a pair of coacting shear frames equipped with cutting blades coupled to said cranks for vertical reciprocation, and means actuated by said cranks adapted to oscillate said blade frames transversely of the reciprocatory movement imparted to them by said cranks.

11. A flying shear comprising a rotatable shaft having eccentrics provided thereon, a cutter frame mounted on said eccentrics, a blade carried by said frame, a second and pivotally supported blade arranged to slide in said frame and form a cutting pass with said first-mentioned blade, a connecting link arranged to be reciprocated with said eccentrics, a slide link connected at one end to said connecting link, a second connecting link connected to the opposite end of said slide link and to said cutter frame at a point spaced from said eccentrics, a fulcrum slidably engaging slide links whereby the aforesaid links are adapted to oscillate said cutter frame and shear blades in the direction of the cutting pass, and adjustable means for moving said slide link in said fulcrum to vary the amplitude of such oscillations.

12. A flying shear comprising a rotatable shaft provided with two pairs of diametrically opposed eccentrics, two pairs of levers pivotally mounted between their ends on said eccentrics, an adjustable support to which one end of said levers is attached, a cutter frame carrying a shear blade pivotally coupled to the other end of one pair of said levers, a second cutter frame carrying a second shear blade pivotally coupled to the other end of the other pair of levers, means for rotating said shaft to reciprocate said blades, and means for moving said adjustable lever support to cause or prevent the shears moving into cutting engagement when the drive shaft is rotated.

13. A flying shear comprising a drive shaft provided with two pairs of diametrically opposed eccentrics, two pair of levers pivotally mounted between their ends on said eccentrics, an adjustable support to which one end of said levers is attached, a cutter frame carrying a shear blade pivotally coupled to the other end of one pair of said levers, a second cutter frame carrying a second shear blade pivotally coupled to the other end of the other pair of levers, means for rotating said drive shaft to reciprocate said blades, means for moving said adjustable lever support to cause or prevent the shear blades moving into cutting engagement when said shaft is rotated, and means actuated with said eccentrics for swinging said frames in a direction transversely to the path of movement of the frames produced by said eccentrics.

14. A flying shear comprising a drive shaft provided with two pairs of diametrically opposed eccentrics, two pairs of levers pivotally mounted between their ends on said eccentrics, an adjustable support to which one end of said levers is attached, a cutter frame carrying a shear blade pivotally coupled to the other end of one pair of said levers, a second cutter frame carrying a second shear blade pivotally coupled to the other end of the other pair of levers, means for rotating said shaft to reciprocate said blades, means for moving said adjustable lever support to cause or prevent the shear moving into cutting engagement when said shaft is rotated, means actuated with said eccentrics for swinging said frame in a direction transversely to the path of movement of the frames produced by said eccentrics, and means for automatically varying the amplitude of said swinging movement.

15. A flying shear comprising a drive shaft provided with two pairs of diametrically opposed eccentrics, two pairs of levers pivotally mounted between their ends on said eccentrics, an adjustable support to which one end of said levers is attached, a cutter frame carrying a shear blade pivotally coupled to the other end of one pair of said levers, a second cutter frame carrying a second shear blade pivotally coupled to the other end of the other pair of said levers, means for rotating said shaft to reciprocate said blades, means for moving said adjustable lever support to cause or prevent the shear moving into cutting engagement when said shaft is rotated, and means for automatically controlling the operation of said lever support adjusting means.

16. A flying shear comprising a pair of cooperating relatively movable blades arranged to form a cutting pass, means for reciprocating said blades into and out of cutting relation with each other, means for oscillating said blades in the direction of the path of travel of the material to be sheared as they are reciprocated by said reciprocating means, means for feeding stock through said cutting pass, means for driving said feeding means, said blade reciprocating and said blade oscillating means, means for varying the speed between said feeding and reciprocating means to vary the length of the cuts, and means for varying the amplitude of the oscillation imparted to said blades by said oscillating means to vary the horizontal cutting speed of said blades and all of said adjusting means being susceptible of operation independently of each other and while the shear is in motion.

17. A flying shear comprising a drive shaft provided with two pairs of opposed eccentrics, two pairs of levers pivotally mounted on said eccentrics, a pivotal support constituting a fulcrum to which one end of said levers is attached, a cutter frame carrying a shear blade pivotally coupled to one pair of said levers at a point displaced from said fulcrum, a second cutter frame carrying a second shear blade pivotally coupled to the other pair of levers at a point displaced from said fulcrum, and means for rotating said shaft to reciprocate said blades.

18. A flying shear comprising a drive shaft provided with two pairs of opposed eccentrics, two pairs of levers pivotally mounted on said eccentrics, a pivotal support constituting a fulcrum to which one end of said levers is attached, a cutter frame carrying a shear blade pivotally coupled to one pair of said levers at a point displaced from said fulcrum, a second cutter frame carrying a second shear blade pivotally coupled to the other pair of levers at a point displaced from said fulcrum, means for rotating said shaft to reciprocate said blades, and means for moving said adjustable lever support to cause or prevent the shear moving into cutting engagement when said shaft is rotated.

19. A flying shear comprising a drive shaft provided with two pairs of opposed eccentrics, two pairs of levers pivotally mounted on said eccentrics, a pivotal support constituting a fulcrum to which one end of said levers is attached, a cutter frame carrying a shear blade pivotally coupled to one pair of said levers at a point displaced from said fulcrum, a second cutter frame carrying a second shear blade pivotally coupled to the other pair of levers at a point displaced from said fulcrum, means for rotating said shaft to reciprocate said blades, means for moving said adjustable lever support to cause or prevent the shear moving into cutting engagement when said shaft is rotated, means actuated with said eccentrics for swinging said frame in a direction transversely to the path of movement of the frames produced by said eccentrics, and means for varying the amplitude of said swinging movement.

20. In a flying shear, a pair of cooperating cutting blades, means for moving both of said blades in a path extending both transversely and longitudinally of the path of travel of the material passing through the shear, means for adjusting the transverse movement and means for adjusting the amount of longitudinal movement of said blades themselves.

21. In a flying shear, a pair of cooperating blades, power means for effecting continuous and uninterrupted actuation of said blades, means driven by said power means for supporting and causing said blades to move in a continuous cycle transversely and longitudinally of the path of travel of the material through the shear, means for modifying the transverse movement of said blades, and means for adjusting the amount of their longitudinal movement.

22. In a flying shear, a pair of cooperating cutting blades, means for positively moving said cutting blades in a continuous uninterrupted cycle transversely and longitudinally of the path of travel of the material through the shear, means for adjusting the transverse movement of the blades in said cycle without interrupting the continuity of the cycle and means for adjusting the amplitude of longitudinal movement of said blades.

23. In a flying shear, a pair of cooperating cutting elements, means for continuously moving both of said blades longitudinally of the path of travel of the material passing through the shear, means operative simultaneously with said first-mentioned means for also continuously moving at least one of said cutting elements transversely of the path of travel of the material passing through the shear, means for adjusting the amount of longitudinal movement of both of said cutting elements, and means for adjusting the transverse movement of said transversely movable cutting element to thereby cause the shear to make or miss cuts as the cutting elements are moved through each cycle of movement.

JOHANN HAHN.